(12) United States Patent
Benton

(10) Patent No.: US 7,071,970 B2
(45) Date of Patent: Jul. 4, 2006

(54) VIDEO AUGMENTED ORIENTATION SENSOR

(76) Inventor: Charles Benton, 372 Boothbay Rd., Edgecomb, ME (US) 04556

(*) Notice: Subject to any disclaimer, the term of this patent is extended or adjusted under 35 U.S.C. 154(b) by 442 days.

(21) Appl. No.: 10/385,119

(22) Filed: Mar. 10, 2003

(65) Prior Publication Data

US 2004/0179107 A1    Sep. 16, 2004

(51) Int. Cl.
*H04N 5/232* (2006.01)
*H04N 5/225* (2006.01)
*G03B 39/00* (2006.01)
*G01C 22/00* (2006.01)

(52) U.S. Cl. .................. 348/208.14; 348/207.99; 396/13; 701/28

(58) Field of Classification Search ............. 348/169, 348/148, 208.14, 218.1; 701/28; 396/13
See application file for complete search history.

(56) References Cited

U.S. PATENT DOCUMENTS

| | | | |
|---|---|---|---|
| 3,576,999 A | 5/1971 | Blyth | |
| 4,672,562 A | 6/1987 | Egli et al. | |
| 4,802,757 A | 2/1989 | Pleitner et al. | |
| 4,866,626 A | 9/1989 | Egli | |
| 4,896,154 A | 1/1990 | Factor et al. | |
| 5,155,684 A | 10/1992 | Burke et al. | |
| 5,259,037 A * | 11/1993 | Plunk | 382/154 |
| 5,699,444 A * | 12/1997 | Palm | 382/106 |
| 5,897,223 A * | 4/1999 | Tritchew et al. | 396/13 |
| 5,911,767 A | 6/1999 | Garibotto et al. | |
| 6,278,918 B1 | 8/2001 | Dickson et al. | |
| 6,285,930 B1 | 9/2001 | Dickson et al. | |
| 6,292,215 B1 * | 9/2001 | Vincent | 348/169 |
| 6,453,223 B1 * | 9/2002 | Kelly et al. | 701/28 |
| 6,466,259 B1 * | 10/2002 | Stanton | 348/148 |
| 6,734,911 B1 * | 5/2004 | Lyons | 348/340 |
| 6,798,443 B1 * | 9/2004 | Maguire, Jr. | 348/121 |
| 2002/0069013 A1 | 6/2002 | Naab et al. | |

* cited by examiner

*Primary Examiner*—Thai Tran
*Assistant Examiner*—Heather R. Jones
(74) *Attorney, Agent, or Firm*—Shalom Wertsberger; Saltamar Innovations (57) ABSTRACT

An orientation sensor utilizing an inexpensive but relatively slow base orientation sensor, augmented by capture of a video images, identifying reference objects or regions therein, and calculating displacement of those objects to derive supplementary orientation information. Recurrent base orientation sensor results are used to correct drift of the video based technique. Augmenting the slow but accurate base orientation sensor with the consecutive images derived orientation data, provides a fast and inexpensive orientation sensor.

38 Claims, 5 Drawing Sheets

VIDEO AUGMENTED ORIENTATION SENSOR

FIELD OF THE INVENTION

This invention relates generally to position and orientation sensors and more specifically to position and orientation sensors augmented by video information.

BACKGROUND

Many computerized systems utilize position and orientation sensors. Most notable are virtual and augmented reality systems, computerized recognition systems, robotics, etc. Those sensors are used to learn the location (X, Y, and Z), and orientation (yaw, pitch, and roll) of the sensor.

To increase clarity and brevity, these specifications will relate interchangeably to a combination of location and orientation as 'LOR', and to the combination of yaw, pitch, and roll as 'YPR'.

Many LOR sensors exist that provide location and orientation parameters. The most common ones for location are based on GPS or inertial navigation technologies. For orientation, magnetic and gyroscopic, as well as light based systems are widely used. LOR sensors, or YPR sensors may be divided into two broad categories: absolute sensors and relative sensors. Absolute sensors provide location and/or orientation information in absolute terms, by sensing the location relative to an external reference such as longitude, latitude, bearing, elevation, etc, or by sensing the absolute orientation using earth's magnetic and gravitational, and the like. Relative sensors are placed in a known local position, with a known orientation. Thereafter, the sensor collects and integrates motion information to derive the present position and/or orientation. While the representation may be either relative or absolute, the relative sensor measurement is based on accumulated displacement from a known origin point. Such relative position systems will be alternatively referred to as delta based systems in these specifications.

Many relative sensors suffer from drift errors that stem primarily from cumulative errors in the motion measurements. Therefore, solutions based on relative sensors can operate only for a limited amount of time before the errors become excessive and system accuracy drops below acceptable levels.

The existing absolute sensors suffer from compromises as well: Fast and accurate sensors are prohibitively expensive for many applications. While inexpensive sensors generally provide a position with sufficient accuracy, they require a long time to stabilize and thus are unsuitable for many applications that involve rapid motion in one or more axis. Vehicular, marine and aviation applications are especially vulnerable to the slow resolution time of those inexpensive sensors.

There exist in the art several solutions for fast and precise LOR sensing. Those may be divided into three categories: fiduciaries based, image memorization, and triangulation. Fiduciary based systems rely on the placement of markers—either objects or marked up points such as a grid, in the imaged scene. Identification of the fiduciaries by image analysis allows finding both the location and the orientation of the sensor. Naturally, this type of solution requires preplacement of the fiduciaries, an act often impractical for many applications, most specifically in environments hostile to the placement of such fiduciaries, such as in military augmented reality systems.

Memorization based sensors utilize a library of memorized images taken at an earlier time, with LOR information attached to the images. Comparisons between current image and one or more images stored in the library provide for LOR information. In some cases, a present image may provide location information, from which a relative sensor can derive an initial placement. Relative motion sensing provides for LOR thereafter, until the errors discussed above make the information unusable. Memorization requires video knowledge of the environment prior to use. Such knowledge is not always available and prevents the use of memorization sensors in a new environment.

Triangulation sensors use devices such as RF transponders, mirrors that reflect light emanating from the system such as laser light and the like, to receive information from the environment. This again requires placement of the transponders or mirrors in the environment which oftentimes makes the solution unusable.

It should be noted that most often the speed of location change tend to be far slower than the speed of YPR change. Moreover, for many practical applications the rate of location change is sufficiently small to permit the use of an inexpensive location sensor as the only means for location information. However changes in YPR are far faster, and thus require fast resolution. This is especially the case when the system is used to provide visual information such as in an augmented reality system, where the user perception is severely hampered by registration errors with the environment.

U.S. Pat. No. 4,802,757 to Pleitner et al. describes a system for determining attitude of a moving imaging sensor platform by utilizing a digital image correlator for comparing successive images of the terrain taken from a second image sensor in known LOR. The second image sensor may be located on a satellite or the like. Clearly this solution is only viable as long as the second image source is available, which limit the system use. However Pleitner et al. provides some algorithmic solution to finding YPR information from video image comparison.

In U.S. Pat. No. 6,453,223 to Kelly et al. and in US published application US2002/0069013n to Navab et al. a computer assisted methods for determining position and orientation are provided. The methods include sensing an image of the scene and comparing the sensed image to previously captured images of the scene. This method requires the use of an image map composed of previously captured images of the environment and is not practicable in many applications.

U.S. Pat. No. 4,672,562 is representative of the fiduciary based system, where a target point array is placed in fixed relation to an object. Spatial information of the object is derived from an image in correspondence to the target points.

U.S. Pat. No. 6,285,930 to Dickson et al. teaches an image based method for sensing the orientation of crop rows relative to agricultural machinery and controlling the machinery or some aspects of its operation responsive to that orientation.

An algorithmic source of computing orientation relative to a ground beacon array (fiduciaries) may be found in Egli's U.S. Pat. No. 4,866,626. These algorithms provide an example of possible methods to derive YPR information by comparing known elements in an image to a newly acquired image.

All those solutions suffer the disadvantage of requiring training or placing objects in the environment. If for example one of the uses of the system is entering into an environment for the first time, such as by a ship entering a new port, or an airplane flying over new terrain, or a combat team entering a hostile environment, the solutions provided are impractical. There is therefore a clear and unanswered need for a system that will provide LOR data in a fast and efficient manner and at reasonably low cost. The present invention aim at providing an apparatus and a method for answering this need.

SHORT DESCRIPTION

An aspect of the invention provides for an affordable and accurate YPR sensing by combining an inexpensive YPR sensor while augmenting and enhancing the capabilities of such sensor using video processing techniques.

As a general principle of operation, an inexpensive, and therefore relatively slow, YPR sensor (referred to hereinafter as base sensor, or a base location sensor) is used to obtain an initial YPR solution. A first image is obtained and analyzed to select certain features from the video data. Those features or regions in the image become Reference Image Components or RICs. Subsequent images are taken and compared either to the first image or to any one of the preceding images, intervening between the first and current image. The RICS are again identified, and the relative displacement between the images is used to compute the new orientation. Methods for computing the orientation from the relative displacement are well known in the art, and some have been referred to in the background description above. A preferred method will be described below.

Periodically, the input of the base sensor is used to establish a new datum (i.e. YPR solution), from which another initial image is taken, and the process repeats as required. By the establishment of the new datum the invention overcomes the drift problem inherent with a delta-based system.

Thus one aspect of the invention provides for a video augmented YPR sensor comprising a base sensor adapted to provide YPR information, and a processor coupled to said base sensor. The processor is adapted to receive a first set of YPR information from said base sensor, and receive a first captured image from an image sensor at a known orientation to said base sensor, and identify a plurality of regions in said first image. The processor is further adapted to receive a subsequently captured image, and compute displacement of said regions between said first and subsequent images. Using said displacement, the processor is adapted to compute current YPR parameters. At selected time intervals, or responsive to preselected conditions, the system receives an updated set of YPR parameters from said base sensor, and uses the updated set to correct the current YPR parameters.

Another aspect of the invention provides for a method of deriving YPR information, comprising the steps of:
a. receiving a first set of YPR parameters from a base YPR sensor;
b. capturing a first image from an image sensor at a known orientation to said base sensor;
c. identifying a plurality of regions in said first image;
d. capturing a subsequent image;
e. computing a displacement of said regions between said first image and said subsequent image;
f. compute current YPR parameters from said displacement; and,
g. at selected time intervals, correcting said current YPR parameters using an updated set of YPR parameters from said base sensor.

Similar to the apparatus described, the method may also derive only YPR information from the displacement, and use the location information received from the last update from the base sensor. Also similarly, the displacement may be derived by comparison to the first image or to any intervening image.

Thus aspects of the invention avoid the necessity of placing known objects in the environment, as well as avoiding the need for capture and storage of images from the environment prior to system use. The combination of the displacement of region in the video images combined with the base sensor data overcomes drift and maintains the long-term stability of the sensor according to the present invention.

Yet another aspect of the invention provides for a virtual reality or an augmented reality system utilizing a video augmented orientation sensor comprising a base sensor adapted to provide at least YPR information, and preferably LOR information, and a processor coupled to said base sensor. The processor is adapted to receive a first set of YPR parameters from said base sensor, and receive a captured first image from an image sensor at a known orientation to said base sensor, and to identify a plurality of regions in said first image. The regions serve as RICs. The processor is further adapted receive a subsequently captured image, and compute displacement of said RICs between said first and subsequent images. Using said displacement, the processor is adapted to compute current YPR parameters. At selected time intervals, the system receives an updated set of YPR, or preferably LOR parameters from said base sensor, and uses said updated set to correct said current LOR parameters.

In another preferred embodiment of the invention, there is provided a method for providing LOR data to a virtual reality or an augmented reality system, the method comprising the steps of:
a. receiving a first set of YPR parameters from a base orientation sensor;
b. capturing a first image from an image sensor at a known orientation to said base sensor;
c. identifying a plurality of regions (RIC's) in said first image;
d. capturing a subsequent image;
e. computing a displacement of said regions between said first image and said subsequent image;
f. compute current YPR parameters from said displacement; and,
g. at selected time intervals, correcting said current YPR parameters using an updated set of YPR parameters from said base sensor.

In a preferred embodiment, the processor calculates only YPR information, which is added to the location information received from the base sensor to generate a complete LOR solution.

Additional aspects and modification of the invention will be further described and made clearer below.

BRIEF DESCRIPTION OF THE DRAWINGS

The enclosed drawings will aid in further understanding of different aspects of the invention.

DETAILED DESCRIPTION

While the invention is described in general terms for use in a virtual reality or in an augmented reality system, it will be clear to those skilled in the art that certain aspects of the invention extend to numerous other fields. By way of non limiting example, the invention may be utilized to collect orientation data for captured video in general, such as for a video camera, which naturally extends the usage of such system to methods such a aerial photography, satellite photography, movie cameras, and the like. Similarly, the invention may be utilized in a navigation system allowing for example utilization of an inexpensive orientation sensor in an aerial vehicle such as a cruise missile, unmanned aircraft, and the like. Other Modifications to further adapt the invention toward a virtual/augmented reality systems, navigation systems, and the like, will be clear to those skilled in the art.

While location sensing and orientation sensing are often obtained by two separate sensors, the data comprising location information and the data comprising the orientation information are commonly required together for many practical applications. Thus while the data may be supplied by two separate sensors, these specifications will relate to them as one LOR sensor, unless clearly required differently by the immediate context. The LOR base sensor may utilize GPS, gyroscopes, earth magnetic field, gravity, astronomical data, radio, a fiducial based system, or any other LOR system, to derive at least orientation information, but preferably a complete LOR resolution. Clearly, the invention may be used only for obtaining YPR information when location information is not important or not desired for the specific circumstances or application.

Figure 1:
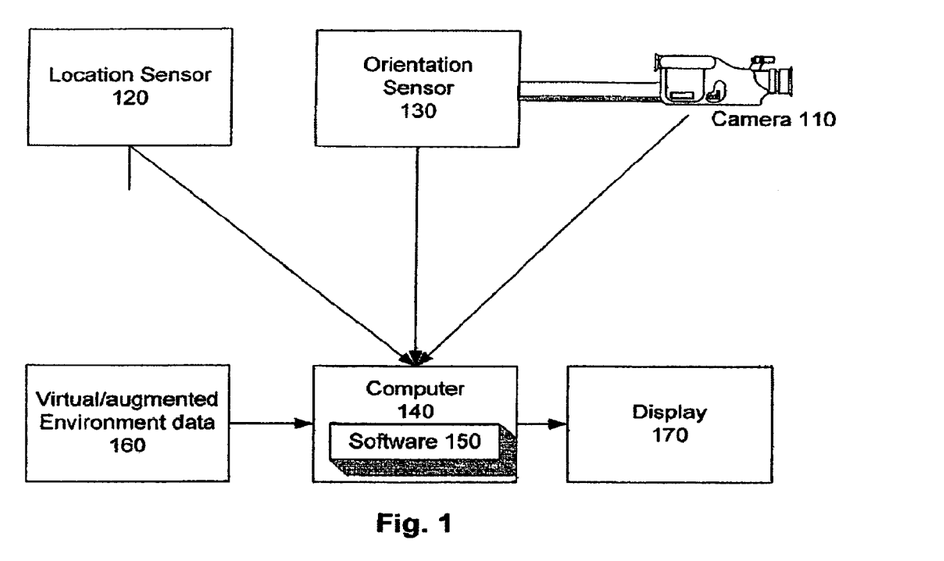
FIG. 1 depicts a general outline of the preferred embodiment of the invention, while incorporated with a virtual/augmented reality system.

FIG. 1 depicts a general outline of a virtual or augmented reality system utilizing the preferred embodiment of the invention. A location sensor 120 is coupled to a computer 140, to provide periodic location information. A camera 110 (preferably a video camera) is coupled to an orientation sensor 130, which is adapted to sense the camera orientation, either directly (i.e. having a rigid relationship between the YPR sensor and the camera), or indirectly (e.g. by having the sensor fixed to a platform with a known or measurable orientation between the platform and the camera). The computer 140 is adapted to execute software 150 that amongst other things can perform the general block diagram of FIG. 2. In addition, in the preferred embodiment, the computer is coupled to a virtual reality and/or augmented reality data 160. Utilizing the LOR information, the computer can present the virtual/augmented reality on the display 170.

Figure 2:
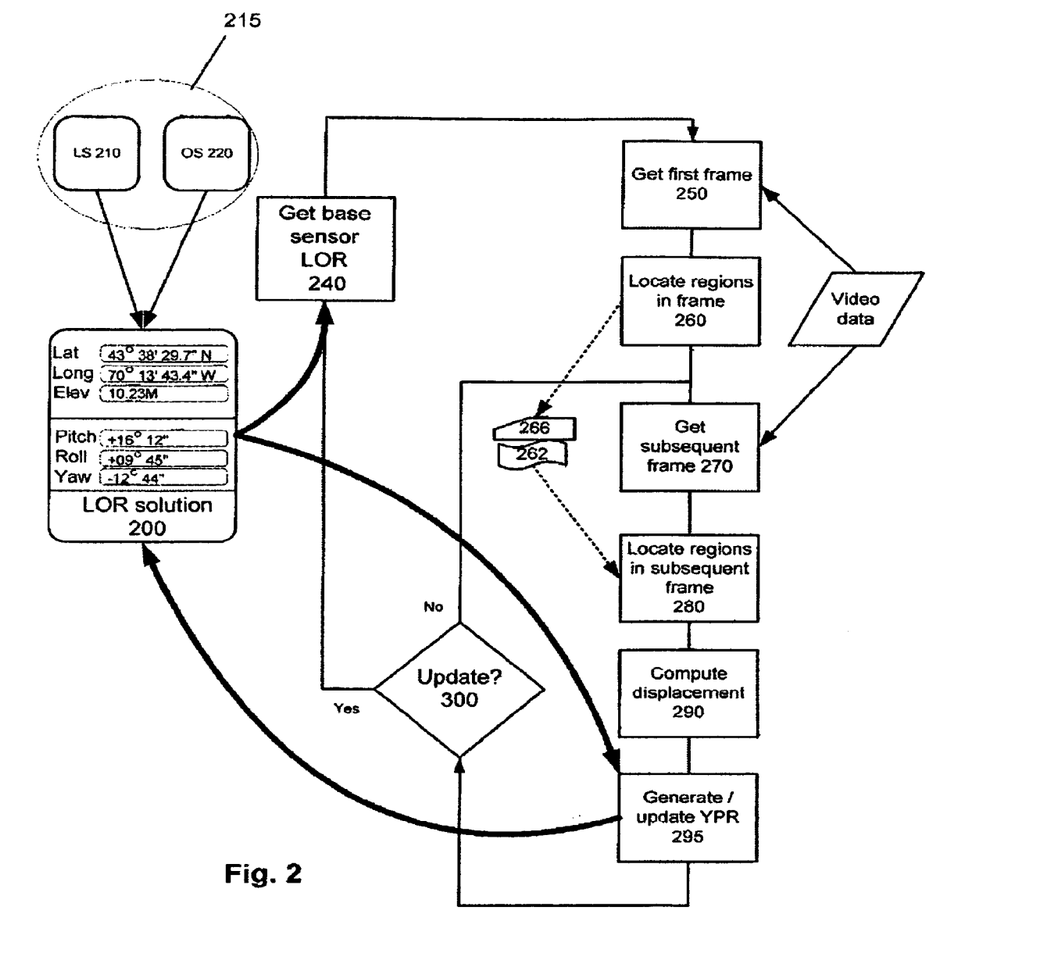
FIG. 2 depicts a block diagram representing general flow of the operation of the preferred embodiment of the invention.

FIG. 2 shows an example of process flow of the preferred embodiment of the invention. Initial LOR data is collected from location sensor 210 and orientation sensor 220 in 240. The collected data becomes the current LOR solution 200. At the same time, or at sufficiently close temporal proximity, a 'first frame' is captured 250. Typically, this will be carried out by having a camera continually collect image data, such as a video stream, and the frame being taken at the time the LOR data (or at least the YPR data portion of the LOR) is valid becomes the 'first frame'. It should be noted however that any device capable of capturing an image or an image representation such as a still camera, a planar IR sensor, etc. may be used.

The software than analyzes the frame data and identifies 260 at least two regions 262 and 266 in the image (RICs). The RICs may be identified by any convenient method, such as color, edges, heat signature, and the like. While there is a certain risk of identifying a moving object, this risk can be minimized by using certain heuristic assumptions and by increasing the number of RIC identified. For many applications, even the use of a moving object for a RIC does not present a major problem. If the object movement is slow relative to the rate of frames analyzed, and the rate of updates from the sensors, then the error will likely be negligible.

When a subsequent frame is captured 270 and analyzed, RICs 262 and 266 are identified in it 280. If sufficient number of the RICs can't be identified, a new YPR fix is required from the base sensor. Otherwise, a displacement is calculated between the first and subsequent frames 290. The differences in orientation of the regions allows such calculation to determine the displacement between in which the first frame was taken, versus the current frame. The displacement and the YPR of the previous frame are used to calculate a new current YPR 295. The current LOR 200 is than updated.

It should be noted that the process works both on comparison between the 'first' frame and the present frame, or between the present frame and any antecedent frame. In the preferred embodiment, the consecutive frames are compared to each other.

Figure 4A:
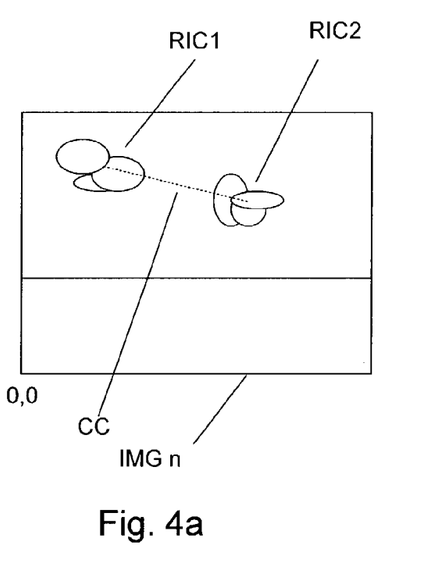
FIGS. 4a and 4b represent a general diagram of RIC's and their use for computation of present YPR from previous YPR and a displacement.
Figure 4B:
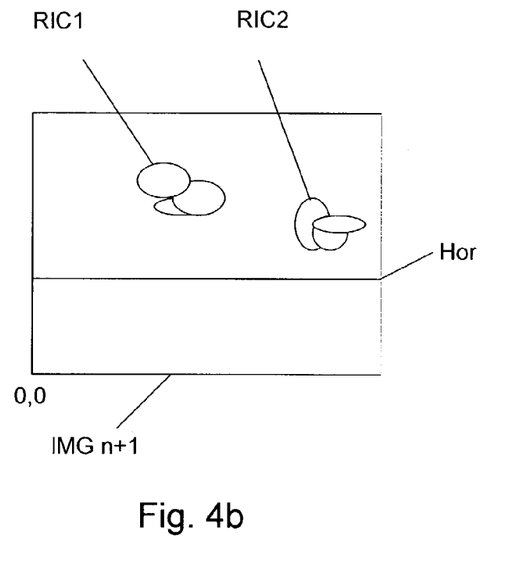

FIGS. 4a and 4b represent a simplified example of displacement calculation. Clearly identified images, such as clouds in the example, are used as RICs. Identifying objects in an image is, as mentioned above, a well known process, and may utilize shape recognition, edge recognition, and other characteristics observed from the image. By way of non-limiting example, the image itself is 90° wide by 60° tall. The image is also 300 pixels wide by 200 pixels tall. Thus, each pixel represents 0.3° in width, and 0.3° in height.

In this example, it is assumed there is no change in roll. Thus for example, in the first frame RIC1 is at 50,180 and RIC2 is at 180, 150. In the second frame RIC1 is at 150,160 and RIC2 is at 280, 130. In both cases the change in coordinates (x, y delta) is +100,−20. Using the known translation of pixels to angle, the pixel displacement translates into a yaw change of $(0.3° \times 100) = 30°$ and a pitch change of $(0.3° \times -20) = -6.0°$. Heading information may be added to the equation if applicable.

If roll is introduced, then the following additional steps are performed. It is assumed that the roll axis is the center of the screen, and software can rotate the image about this axis. Using the last known roll value, the first image is rotated so that it represents the image with zero degrees of roll. Then the second image is rotated a similar amount. Next, roll is determined by comparing the angular difference of a line drawn between the RIC pair of the first frame CC, and a similar line derived from the RIC pair of the second frame. If the lines angle match, then no roll has occurred between frames. If they do not match, then the second image is rotated to zero degrees of roll prior to calculating pitch and yaw.

Alternatively, a well-defined line, such as horizon line HOR can be identified and used for providing a roll angle.

It should be noted that if the aspect ratio of the image in both degrees and pixel is not identical, then the image can be stretched so that each pixel has the same height and width. Alternatively, the impact of aspect ratio can be applied mathematically within the calculations using well-known methods. Similarly, algorithms can be used to enable processing of the RICs to determine roll without first rotating the images to "zero roll", or resolving other YPR situations as known, using similar mathematical methods. While it is possible to derive the orientation change mathematically, utilizing pixels is advantageous for stabilizing an augmented or virtual reality system as the calculations are simple, and the resolution in terms of pixels provides the required resolution to stabilize an image for a viewer.

Several hardware solutions for calculating displacement in terms of region within a set of images are available. Most prominently, as the MPEG (Motion Pictures Engineering Group) standard discuss motion vectors at length, several attempts have been made to perform such motion vector calculation by hardware, or a specialized application of hardware and software, to provide efficient MPEG encoding. It will be clear to those skilled in the art that such specialized hardware or hardware/software combination is equivalent to the described and claimed software operations and that the invention contemplates and extends to such methods and hardware.

Dead reckoning or other methods such as ranging or measurements of change in size, or various combinations of well-known methods may be utilized to obtain location compensation if desired.

In many applications, especially where the total change in location is small relative to the time between successive base sensor 215 readings, the location information from the base sensor is sufficient as the error is negligible. In such cases the displacement calculated is used derive only YPR information. The last known location, or a location obtained from dead reckoning, ranging, and other well known methods, is used to provide the location portion of the LOC solution, and the image analysis is used to provide the YPR portion. An example of such embodiment is a LOR sensor place on board a ship or a tank, where the location is not likely to change very significantly between base sensor readings, but the orientation, or YPR may change significantly several times per second. Motion information inputs such as heading information input, speed information inputs, and on an airplane, altitude information are supplied to the system, and the processor uses those to compute and update the current LOR. Similarly, radar or laser ranging inputs and the like may be provided.

The decision 300 of when to use an update from the base LOR sensor 215 is a matter of technical choice. In some cases, such as when regions are not present between frames, the system either uses old data or stops providing a valid YPR data until new data arrives from the base sensor 215. Other means of identifying excessive drift may be presented, especially when combined with knowledge about the environment and from additional sensors. However in the preferred embodiment, the most common way for update is periodical. Whenever the base sensor asserts that it has a valid YPR, the current frame becomes a 'first frame', regions are identified therein and the process repeats. If no update is required at step 300, the process continues at stage 270. However, in the preferred embodiment, the updated LOR data is utilized whenever the base sensor 215 reaches a valid LOR resolution.

Figure 3:
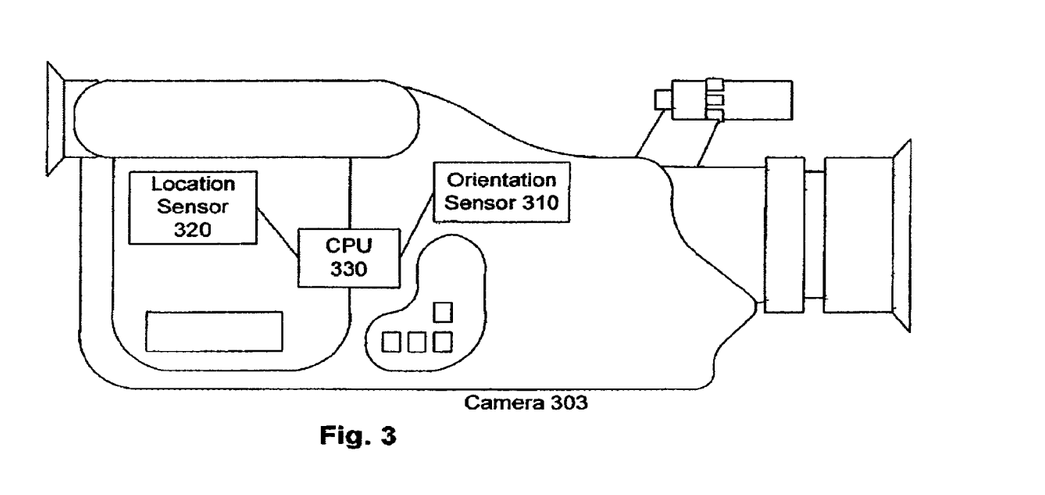
FIG. 3 depicts a block diagram of a video camera utilizing the invention.

FIG. 3 represents yet another preferred embodiment, wherein the location sensor 320 and orientation sensor 310 are both coupled directly to a video camera 303, in this example a camcorder. Many camcorders have the capability to record time and date on their recording media. With the present invention the camcorder may also record LOR, or at least YPR information. If sufficiently powerful, the camcorder CPU may be utilized as CPU 330, or dedicated computing facilities may be utilized.

Figure 5:
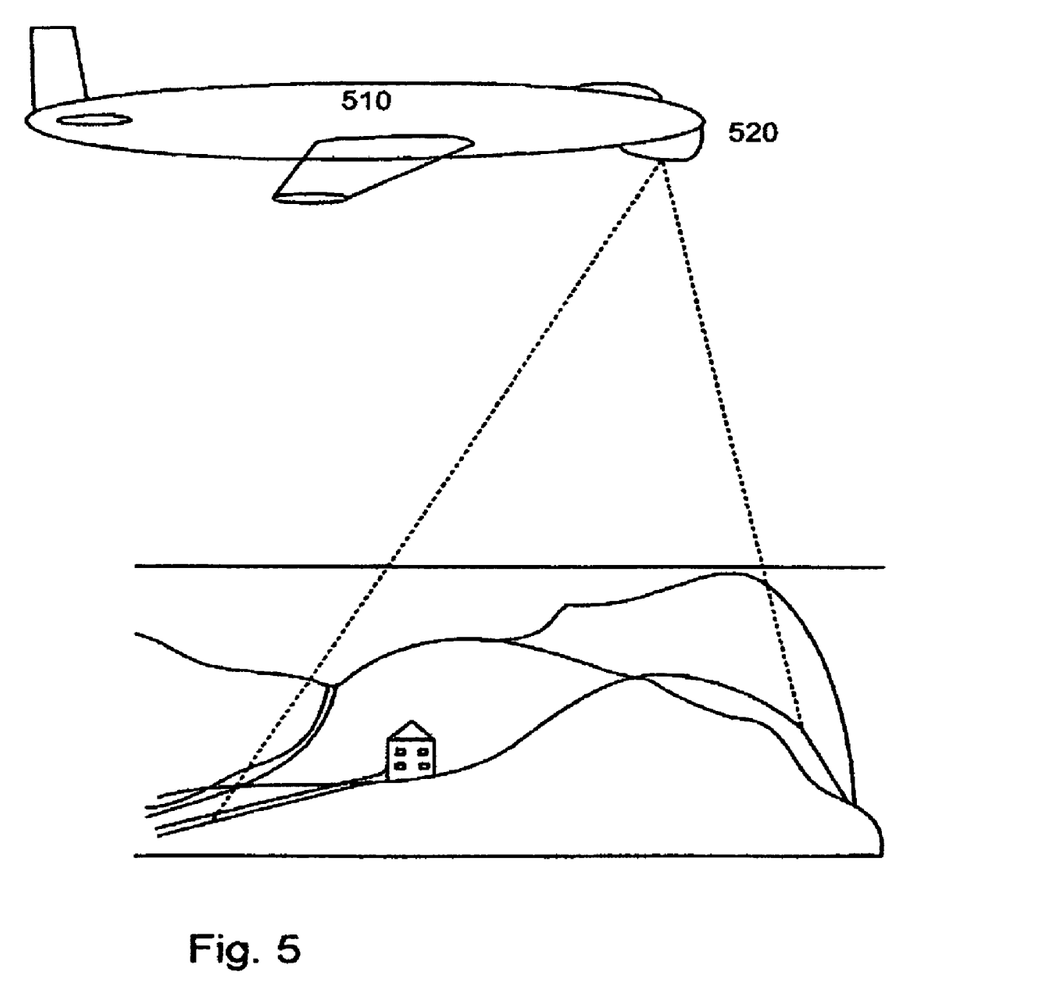
FIG. 5 depict use of an Aerial surveillance or navigation.

FIG. 5 represents an example of utilizing the example for aerial navigation or aerial orientation. The sensor, 520 coupled to a video camera is place on an aerial platform 510. When the images are analyzed as described for the sensor description above, the orientation of the camera (or by implication the aerial platform itself) may be deduced as described, and if needed compensated for.

Figure 6:
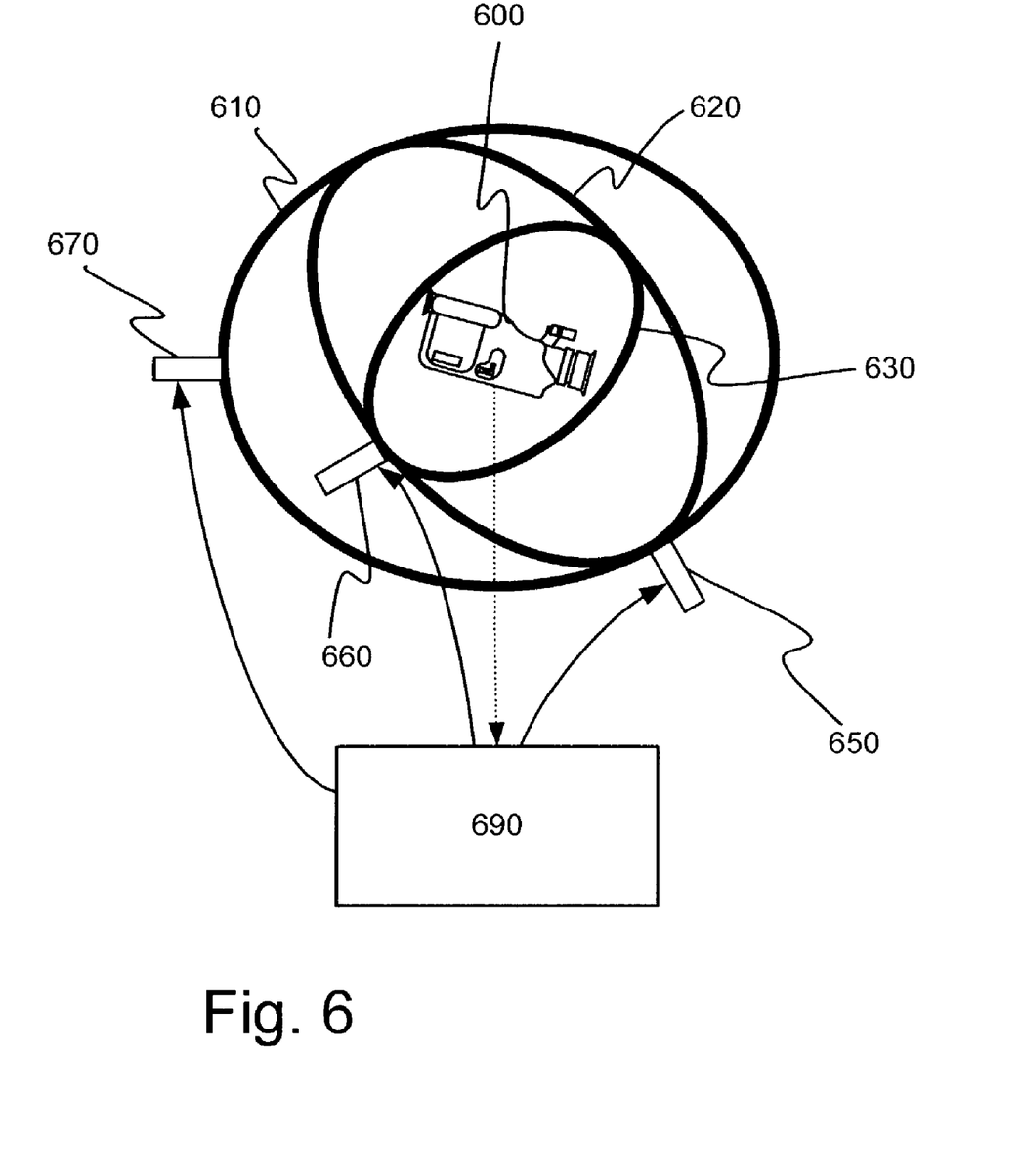
FIG. 6 depicts the invention utilized to stabilize a platform having several degrees of freedom.

FIG. 6 shows yet another useful embodiment of the invention, wherein a video camera is mounted to a suspension providing 3 degrees of freedom, and is used to control the stability of the camera or other equipment mounted to suspended platform. Rings 610, 620, and 630, form the three degrees of freedom suspension platform as known. Camera 600 utilizing the YPR sensor technology described above, is coupled to the platform, providing it with the required 3 degrees of freedom. The sensor output is coupled to pitch roll and yaw actuators 650, 660, and 670. Sensor output is fed to the control unit 690 which in turn controls the actuators to keep the camera steady at a selected orientation. In this case LOR information is likely immaterial, and only the YPR information is required. However LOR information may further be recorded if desired.

The invention may also be utilized for providing YPR information for a personal, e.g. wearable, augmented or virtual reality system.

The invention is particularly applicable in virtual or augmented reality systems. Thus, in a preferred embodiment of the invention the video augmented sensor may be coupled in combination with a computer image generation system that can create computer generated imagery by transforming a 3 dimensional model into a 2 dimensional presentation based upon the computer generated image viewpoint. However it may also facilitate generation of 3 dimensional computer generated modeling system. A Virtual Reality Database comprising a 3 dimensional virtual environment model that can be used by the computer image generation system to generate virtual imagery is also provided. A processor (either the same processor used by the sensor or a separate one) capable of generating the images from the database is coupled to the sensor is also provided. In an augmented reality system, the processor is also capable of merging the real world image with computer generated images. Such merging can be a digital process within the computer generation system, an analog or digital external mixing circuit, or see through eyewear.

In certain applications it is desirable to utilize an image source sensitive to infrared or ultraviolet. It should also be noted that the coupling between the image sensor and the orientation sensor does not have to be direct. By way of example a camera may be mounted on a masthead of a ship, and the orientation sensor may be coupled to the ship as a whole. Even if the camera orientation relative to the ship is variable, the derivation of the camera orientation from the combination of the sensed ship orientation and the camera orientation relative to the ship is clear to those skilled in the art. Also a matter of technical choice is parameters such as camera resolution, capturing and processing speeds, and the like, as the system provides for an accurate resolution from the base sensor, and the invention may be utilized only to provide sufficient compensation for the specific application, between successive valid base sensor resolutions.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

What is claimed is:

1. A video augmented orientation sensor comprising:
   a base sensor adapted to measure and provide orientation information;
   a processor coupled to said base sensor, and adapted to:
      receive a current set of orientation information from said base sensor;
      receive a first captured image from an image sensor at a known orientation to said base sensor;
      identify at least two reference image components in said first image;
      receive a subsequently captured image;
      compute displacement of said reference image components between said first and subsequent images;
      using said displacement, compute and update said current orientation information; and,
      upon reception of a subsequent set of orientation information from said base sensor, utilizing data from said subsequent set to correct or replace said current orientation information.

2. A video augmented orientation sensor according to claim 1, wherein said step of utilizing occurs after a plurality of acquisitions of a valid orientation resolution by said base sensor.

3. A video augmented orientation sensor according to claim 1 wherein said first and subsequent image comprises infrared or ultra-violet data.

4. A video augmented orientation sensor according to claim 1 further comprising an image sensor to capture said images.

5. A video augmented orientation sensor according to claim 1, further comprising a video camera.

6. A video augmented orientation sensor according to claim 5 wherein said video camera is sensitive to infrared or ultraviolet data.

7. A video augmented orientation sensor according to claim 1 wherein said base sensor is further adapted to provide location information.

8. A video augmented orientation sensor according to claim 7, wherein said current orientation information is combined with said location information to create a current location and orientation information.

9. A video augmented orientation sensor according to claim 1 wherein said base sensor is coupled directly or indirectly to a video camera, for capturing said first and subsequent images.

10. A video augmented orientation sensor according to claim 9, wherein said camera is coupled to said base sensor indirectly, and wherein said processor is farther adapted to receive information representative of the relative orientation between said base sensor and said camera.

11. A video augmented orientation sensor according to claim 10, wherein the orientation of said camera is variable.

12. A video augmented orientation sensor according to claim 1 wherein said processor is adapted to replace said first image with a subsequent image, so as to have the processor compare consecutive frames from a video image.

13. A video augmented orientation sensor according to claim 1 wherein said base sensor further comprises a location sensor, and wherein said processor is further adapted to receive speed and heading information of a platform to which the sensor is coupled, and to compute a dead reckoning location information from said speed and heading.

14. A video augmented orientation sensor according to claim 1 wherein said base sensor further comprises a location sensor, and wherein said processor is further adapted to receive ranging information, and to compute a location information from said ranging information.

15. A method of deriving orientation data comprising the steps of:
   sensing a first set of orientation information from a base orientation sensor;
   capturing a first image from an image sensor at a known orientation to said base sensor;
   identifying at least two reference image components in said first image;
   capturing a subsequent image;
   computing a displacement of said reference image components between said first image and said subsequent image;
   updating current orientation information utilizing said displacement; and,
   receiving a subsequent set of orientation information from said base sensor, and utilizing said second set of information to correct or replace said current orientation parameters after it was updated at least once by said step of updating.

16. A method of deriving orientation data according to claim 15 wherein said base sensor further comprises a location sensor for providing location data.

17. A method of deriving orientation data according to claim 16, wherein said step of computing comprises the steps of computing yaw displacement, pitch displacement and roll displacement.

18. A method of deriving orientation data according to claim 16, wherein said step of receiving is initiated when said reference image components are unidentifiable or fall outside pre-determined parameters.

19. A method of deriving orientation data according to claim 16, further comprising the steps of receiving external motion inputs; and, performing dead reckoning computation to derive current location information from previously known location information and said motion inputs.

20. A method of deriving orientation data according to claim 19, wherein said motion inputs are selected from a group comprising course, heading, speed, altitude, or a combination thereof.

21. A method of deriving orientation data according to claim 16, further comprising the step of ranging distance and direction information to a known reference point, and utilizing said data to compute current location parameters between successive steps of receiving location information from said base sensor.

22. A method of deriving orientation data according to claim 15, wherein said step of receiving is carried out in response to said base sensor obtaining a valid orientation resolution.

23. A method of deriving orientation data according to claim 15, wherein said first and subsequent image comprises infrared or ultra-violet data.

24. A method of deriving orientation data according to claim 15, further comprising the step of replacing said first image with said subsequent image, to cause said step of computing the displacement to occur between two consecutive images.

25. A method of deriving orientation data according to claim 15, further comprising the step of replacing said first image with any image subsequent thereto, to cause said step of computing the displacement to occur between any two captured images.

26. A method of deriving orientation data according to claim 15, further comprising the step of replacing said first image with any subsequent image, to cause said step of computing the displacement to occur between any two captured images.

27. A virtual reality or an augmented reality system comprising:
a computer image generation system coupled to said sensor, the image generating system having a virtual Reality Database comprising a 3 dimensional virtual environment model, and a processor adapted to generating images from the database;
a display system adapted to display said generated images
a video augmented orientation sensor coupled to said image generation system, said orientation sensor comprising:
a base sensor adapted to measure and provide at least orientation information;
a processor coupled to said base sensor, and adapted to:
receive a first set of orientation information from said base sensor;
receive a first captured image from an image sensor at a known orientation to said base sensor;
identify at least two reference image components in said first image;
receive a subsequently captured image;
compute displacement of said reference image components between said first and subsequent images;
using said displacement, compute current orientation information; and,
upon reception of a subsequent set of orientation information from said base sensor, utilizing data from said subsequent set to correct or replace said current orientation information;
wherein said orientation sensor is coupled to said image generating system for providing orientation information thereto.

28. A virtual reality or an augmented reality system according to claim 27, further comprising a location sensor for providing location and orientation information to said computer image generation system.

29. A virtual reality or an augmented reality system according to claim 28, wherein said augmented reality system is adapted to be worn by a person.

30. A virtual reality or an augmented reality system according to claim 27, further comprising a video combiner to combine images captured from a camera coupled to said base sensor at a known orientation, and images generated by said computer image generating system.

31. A computer-readable medium storing a computer program that when executed on a computer coupled to a base sensor, will cause said computer to operate substantially as the video augmented location and orientation sensor of claim 1.

32. A computer program that when executed on a computer coupled to a base sensor, will cause said computer to operate substantially as the video augmented location and orientation sensor of claim 7.

33. A video camera stabilizer comprising:
a suspension constructed to support a camera and allow said camera controlled freedom of movement in a plurality of axes;
a plurality of actuators, each adapted to control movement of said camera in at least one axis;
a controller coupled to said actuators;
a video augmented orientation sensor comprising:
a base sensor adapted to measure and provide at least orientation information;
a processor coupled to said base sensor, and adapted to:
receive a first set of orientation information from said base sensor;
receive a first captured image from an image sensor at a known orientation to said base sensor;
identify at least two reference rage components in said first image;
receive a subsequently captured image;
compute displacement of said reference image components between said first and subsequent images;
using said displacement, compute current orientation information; and,
upon reception of a subsequent set of orientation information from said base sensor, utilizing data from said subsequent set to correct or replace said current orientation information;
wherein said video augmented orientation sensor is coupled to said control unit, and the control unit is adapted to operate said plurality of actuators to maintain said camera at a controlled orientation, responsive to orientation data received from said video augmented orientation sensor.

34. A video camera stabilizer according to claim 33, wherein said camera is used to capture said first and subsequent images.

35. A video camera stabilizer according to claim 33 wherein said processor is adapted to replace said first image with a subsequent image, so as to have the processor compare consecutive frames from a video image.

36. A video camera stabilizer according to claim 33, wherein said camera is used to capture said first and subsequent images; and wherein said processor is adapted to replace said first image with a subsequent image, so as to have the processor compare consecutive frames from a video image.

37. A method for providing Location and orientation (LOR) data to a virtual reality or an augmented reality system, the method comprising the steps of:
receiving a first set of LOR parameters from a base LOR sensor, said LOR parameters comprising a first set of orientation parameters and a first set of location parameters;
capturing a first image from an image sensor at a known orientation to said base sensor;
identifying a plurality of reference image components in said first image;
capturing a subsequent image;
computing a displacement of said reference image components between said first image and said subsequent image;
updating current orientation parameters using said displacement; and,
correcting said current LOR parameters after they were updated at least once by said step of updating using an updated or replaced set of LOR parameters received from said base sensor, for generating a computer image or components thereof.

38. A method for providing Location and orientation (LOR) data to a virtual reality or an augmented reality system according to claim 37, further comprising the step of replacing said first image with said subsequent image, to cause said step of computing the displacement to occur between two consecutive images.

* * * * *